(12) United States Patent
Zou et al.

(10) Patent No.: US 8,002,484 B2
(45) Date of Patent: Aug. 23, 2011

(54) PORTABLE TERMINAL WITH KEYPAD LIFTING MECHANISM

(75) Inventors: Zhi-Gang Zou, Shenzhen (CN); Zhi-Gang Peng, Shenzhen (CN); Zhi-Lan Chen, Shenzhen (CN); Tao Yin, Shenzhen (CN); Zhi-Qiang Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 309 days.

(21) Appl. No.: 12/483,324

(22) Filed: Jun. 12, 2009

(65) Prior Publication Data

US 2010/0000844 A1    Jan. 7, 2010

(30) Foreign Application Priority Data

Jul. 3, 2008    (CN) .......................... 2008 1 0302517

(51) Int. Cl.
*G06F 3/023* (2006.01)
(52) U.S. Cl. ...................................... 400/472
(58) Field of Classification Search .................. 400/472, 400/480, 481, 488, 489, 713, 714; 455/550.1, 455/566, 90.3, 575.1; 361/679.11–679.16; 379/433.01, 433.04
See application file for complete search history.

(56) References Cited

U.S. PATENT DOCUMENTS

| | | | | |
|---|---|---|---|---|
| 5,519,570 A * | 5/1996 | Chung | | 400/472 |
| 5,532,904 A * | 7/1996 | Sellers | | 361/679.13 |
| 5,635,928 A * | 6/1997 | Takagi et al. | | 361/679.13 |
| 5,793,311 A * | 8/1998 | Wood | | 341/22 |
| 5,933,320 A * | 8/1999 | Malhi | | 361/679.55 |
| 5,933,812 A * | 8/1999 | Meyer et al. | | 361/679.26 |
| 5,948,360 A * | 9/1999 | Rao et al. | | 422/65 |
| 5,971,637 A * | 10/1999 | Malhi et al. | | 400/491.2 |
| 6,091,600 A * | 7/2000 | Jeong | | 361/679.12 |
| 6,808,328 B1 * | 10/2004 | Gully | | 400/472 |
| 6,894,626 B2 * | 5/2005 | Olodort et al. | | 400/472 |
| 6,991,389 B2 * | 1/2006 | Mochizuki et al. | | 400/472 |
| 7,286,862 B2 * | 10/2007 | Lee et al. | | 455/575.4 |
| 2003/0059242 A1 * | 3/2003 | Horiuchi et al. | | 400/489 |
| 2004/0027335 A1 | 2/2004 | Lin | | |
| 2004/0126170 A1 * | 7/2004 | Hagerman | | 400/472 |
| 2005/0245297 A1 | 11/2005 | Lee et al. | | |
| 2008/0039159 A1 * | 2/2008 | Joo et al. | | 455/575.4 |
| 2008/0075515 A1 * | 3/2008 | Large | | 400/472 |
| 2008/0090627 A1 * | 4/2008 | Jeong et al. | | 455/575.4 |

FOREIGN PATENT DOCUMENTS

| | | |
|---|---|---|
| EP | 1638298 A2 | 3/2006 |
| WO | 2008074358 A1 | 6/2008 |

* cited by examiner

*Primary Examiner* — Briggitte R Hammond
(74) *Attorney, Agent, or Firm* — Atlas Law Group, Inc.

(57) ABSTRACT

A keypad lifting mechanism includes a fixing board, a first board, a guiding frame and a second board. Two stopping members are fixed on the fixing board. The first board is slidable relative to the fixing board. A plurality of wedges are formed on the guiding frame. The second board includes a plurality of protrusions. The second board slides up or down relative to the first board by engagement of the protrusions of the second board and the wedges of the first board. When the first board is moved relative to the fixing board, the guiding frame is stopped by the stopping members and the second board moving relative to the guiding frame so as to move up or down the second board.

20 Claims, 8 Drawing Sheets

PORTABLE TERMINAL WITH KEYPAD LIFTING MECHANISM

CROSS-REFERENCE TO RELATED APPLICATIONS

This application is related to co-pending U.S. patent applications Ser. Nos. (12/484,319 and 12/484,320), all entitled "PORTABLE TERMINAL WITH KEYPAD LIFTING MECHANISM". Such applications have the same assignee as the present application. The above-identified applications are incorporated herein by reference.

BACKGROUND

1. Technical Field

The present disclosure relates to portable terminals, particularly, to a keypad lifting mechanism and a portable terminal with therein.

2. Description of Related Art

Sliding-type terminals have recently appeared in electronic devices to satisfy users' various tastes for improved portability and convenience. For example, in mobile phones, a conventional sliding-type terminal has a first housing and a second housing adapted to linearly reciprocate to be opened or closed. A display device is arranged in one of the housings. A keypad is fixed in the other housing. The keypad can be exposed or hidden by sliding of one of the housing. However, with this configuration, the keypad is recessed relative to the sliding housing. Such structure may cause inconvenience to the users.

Therefore, there is room for improvement within the art.

BRIEF DESCRIPTION OF THE DRAWINGS

Many aspects of the keypad lifting mechanism can be better understood with reference to the following drawings. The components in the drawings are not necessarily drawn to scale, the emphasis instead being placed upon clearly illustrating the principles of the keypad lifting mechanism, in which.

DETAILED DESCRIPTION OF THE EMBODIMENTS

Figure 1:
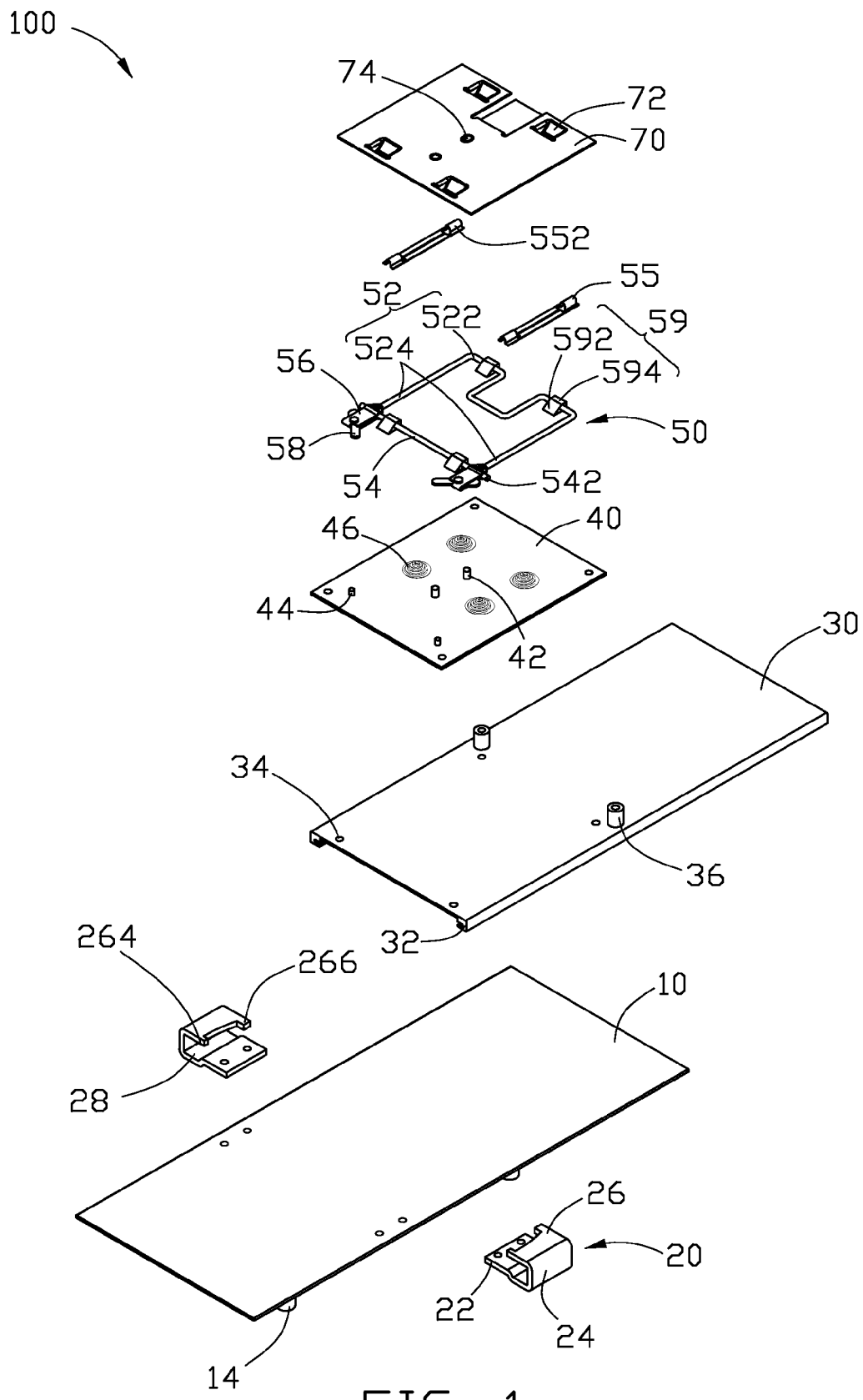
FIG. 1 is an exploded, schematic view of a keypad lifting mechanism in accordance with an exemplary embodiment.
Figure 2:
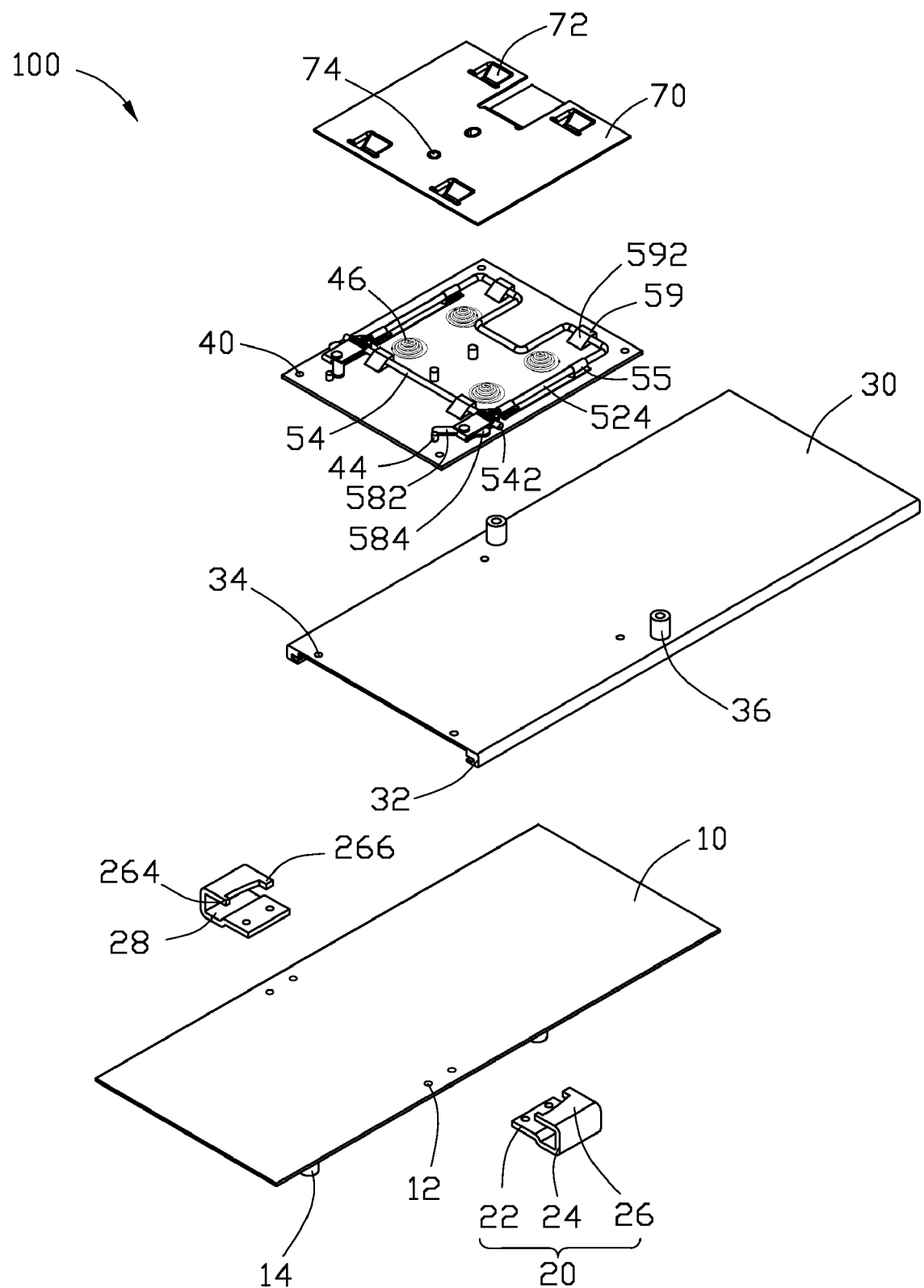
FIG. 2 is similar to FIG. 1.

Referring to FIGS. 1-2, a keypad lifting mechanism 100 is applied to a portable terminal 200 (shown in FIGS. 6-8), in accordance with an exemplary embodiment. The keypad lifting mechanism 100 includes a fixing board 10, two stopping members 20, a sliding board 30, a first board 40, a guiding frame 50 and a second board 70.

Each stopping member 20 includes a fixing portion 22, a stopping portion 26 and a connecting portion 24 connecting with the fixing portion 22. The fixing portion 22 is parallel to the stopping portion 26, and the connecting portion 24 is perpendicular to the fixing portion 22 and the stopping portion 26. The fixing portion 22, the connecting portion 24 and the stopping portion 26 together forms a sliding groove 28. The stopping portion 26 is cut to form a first protruding block 264 and a second protruding block 266. The second protruding block 266 is longer than the first protruding block 264.

The sliding board 30 has two guiding rails 32 formed at two sides thereof. The guiding rails 32 are slidably engaged in the sliding grooves 28 of the stopping members 20. The fixing board 10 can be received between the two guiding rails 32.

The first board 40 has two resisting pins 44 and two positioning posts 42 thereon. The two resisting pins 44 are positioned at one end of the first board 40. A plurality of elastic elements 46 are fixed on the first board 40. The elastic elements 46 may be, for example, helical springs.

The guiding frame 50 includes a first bar 52 and a second bar 54. The second bar 54 includes two end portions 542. The first bar 52 includes a curve portion 522 and two straight portions 524. The two straight portions 524 are parallel to each other. A plurality of wedges 59 are formed on the second bar 54 and the curve portion 522 of the first bar 52. Each wedge 59 has a slope 592 and a flat surface 594 connected to upper part of the slope 592. A guiding piece 55 is attached to each straight portion 524. Each guiding piece 55 includes two sleeves 552 for allowing the straight portion 524 to slide along. Two clips 56 are positioned at two sides of the guiding frame 50, connecting with the second bar 54 and the second board 70. The two end portions 542 of the second bar 54 respectively extend through the clips 56. A swing 58 is rotatably attached to each of the clips 56. Each swing 58 has a first end 582 and a second end 584. The first end 582 and the second end 584 are capable of rotating around a middle portion of each swing 58.

The second board 70 has a plurality of recesses 72. The recesses 72 are formed by pressing inwardly at one side of the second board 70, such that a plurality of corresponding protrusions 76 (shown in FIGS. 4-5) are formed at another side of the second board 70. The positions of the protrusions 76 correspond to those of the wedges 59 of the guiding frame 50. The second board 70 defines two positioning holes 74 for engaging with the positioning posts 42.

Figure 3:
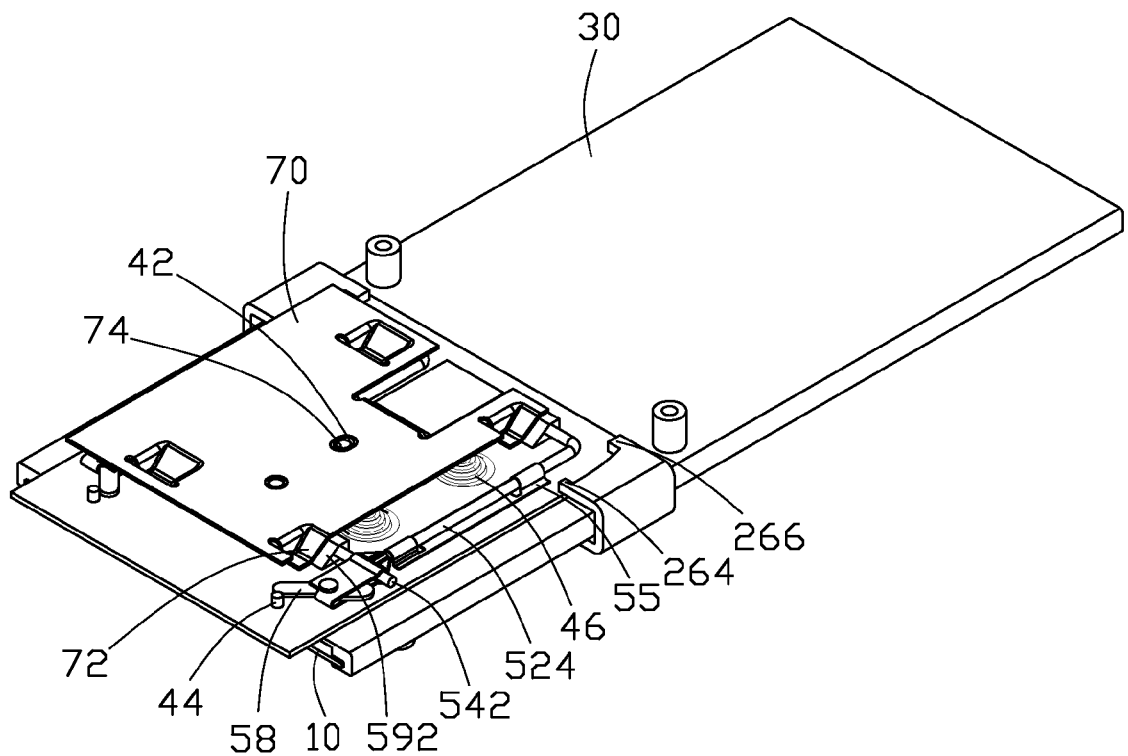
FIG. 3 is an assembled, partially cut-away, schematic view of the keypad lifting mechanism shown in FIG. 1.

Referring to FIG. 3, when assembling the keypad lifting mechanism 100, the fixing portions 22 of the stopping members 20 are fixed at two sides of the fixing board 10, with the stopping portions 26 facing each other. The first board 40 is fixed at one end of the sliding board 30, being opposite to the guiding rails 32. The guiding frame 50 is placed on the first board 40. The guiding pieces 55 are fixed to the first board 40 by means of solder. The first end 582 of each swing 58 resists the corresponding resisting pin 44. The second board 70 is placed on the guiding frame 50. The protrusions 76 of the second board 70 contact the first board 40. One end of each positioning post 42 is engaged in the positioning hole 74 of the second board 70, while one end of each elastic element 46 is fixed to the second board 70. At last, the sliding board 30 is attached to the fixing board 10. The fixing board 10 is positioned between the two guiding rails 32 of the sliding board 30, and the guiding rails 32 are respectively engaged in the stopping members 20. Thus, the guiding rails 32 are capable of sliding in the sliding grooves 28 of the stopping members 20.

Figure 4:
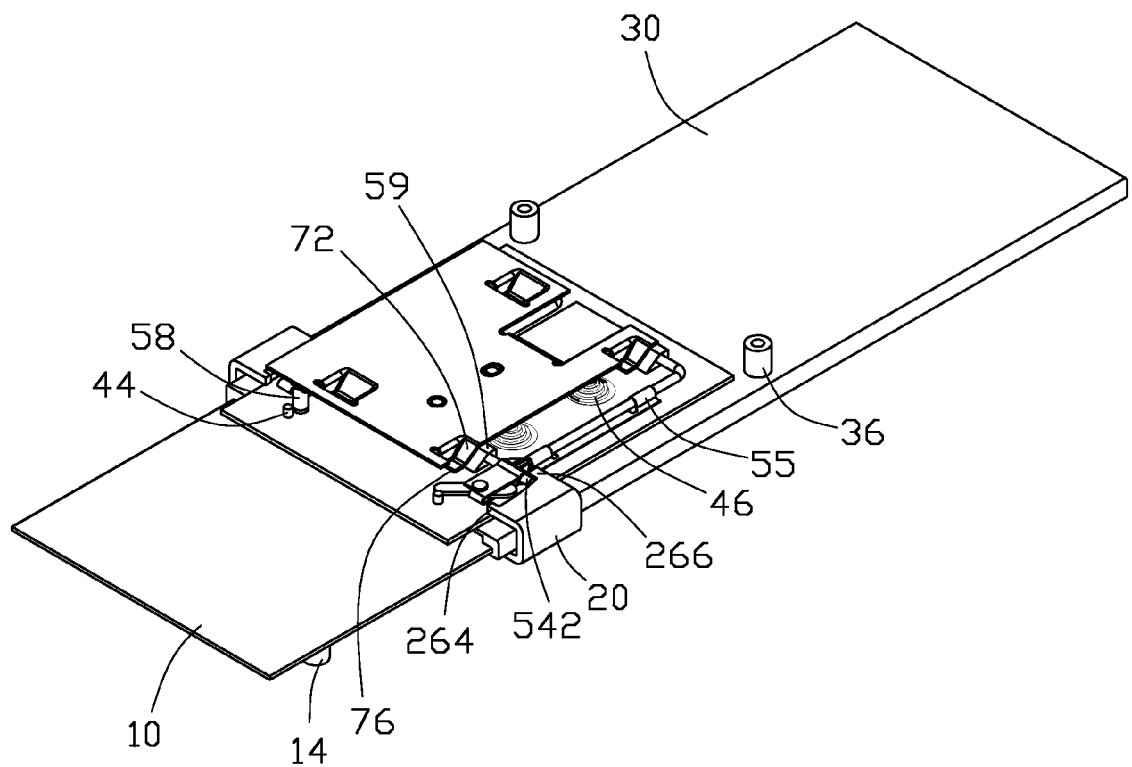
FIG. 4 is similar to FIG. 3, but showing the sliding board pushed away from the fixing board.
Figure 5:
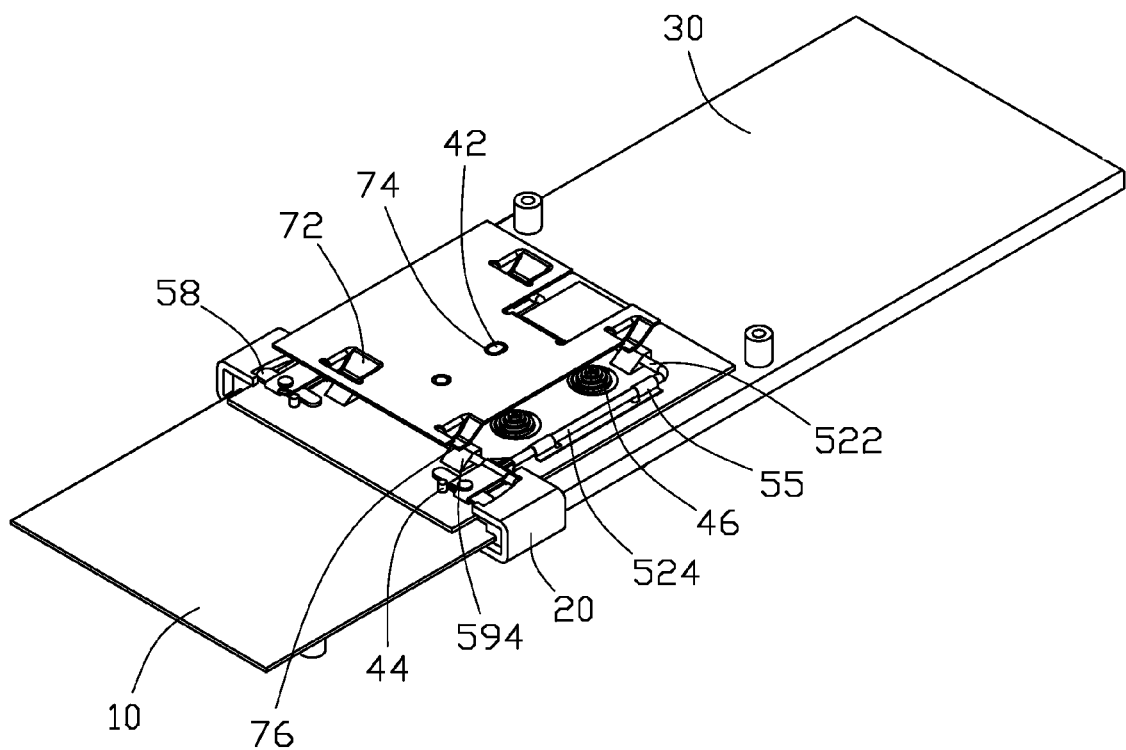
FIG. 5 is similar to FIG. 4, but showing the second board raised relative to the first board.

Referring to FIGS. 4-5, in use, the sliding board 30 is pushed to slide away from the fixing board 10. The first board 40, the guiding frame 50 and the second board 70 are moved with the sliding board 30. When the end portions 542 of the second bar 54 are stopped by the second protruding blocks 266 of the stopping member 20, the guiding frame 50 stops moving. The second board 70 and the first board 40 move relative to the guiding frame 50. The straight portions 524 slide along the guiding pieces 55 fixed on the first board 40 until the guiding pieces 55 resist the second bar 54 of the guiding frame 50. The protrusions 76 of the second board 70 respectively slide along the slopes 592 of the wedges 59, and are then situated on the flat surfaces 594 of the wedges 59. Thus, the second board 70 is raised. At the same time, the elastic elements 46 are deformed, and the swings 58 are forced to rotate by the moving resisting pins 44. When the second board 70 has stopped moving, the second end 584 of each swing 58 is received between the first protruding block 264 and the second protruding block 266 of the stopping member 20.

Figure 6:
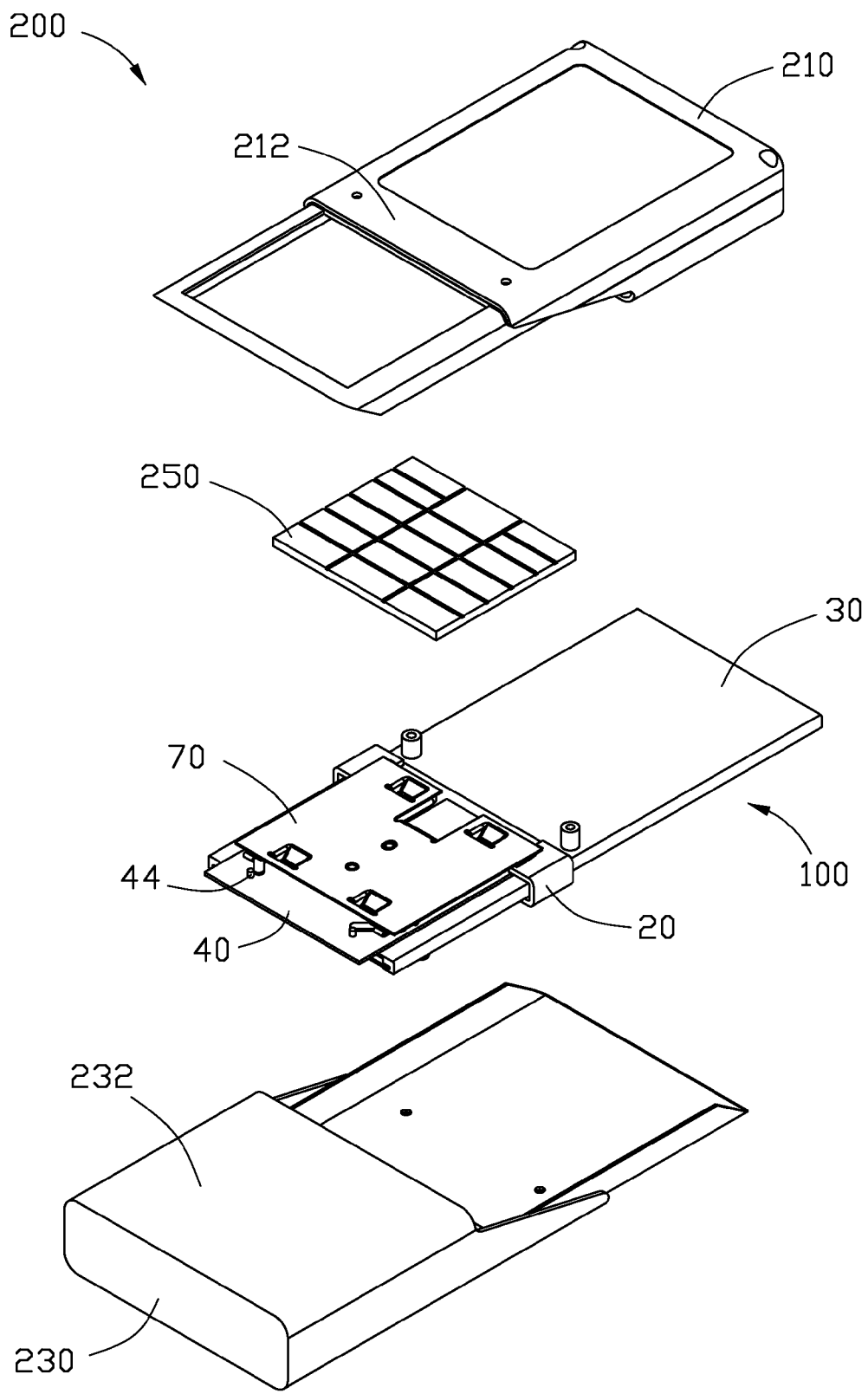
FIG. 6 is an exploded, schematic view of a portable terminal in cooperating with the keypad lifting mechanism shown in FIG. 1, the portable terminal including a keypad.

Referring to FIG. 6, the portable terminal 200 with the keypad lifting mechanism 100 therein further includes a first housing 210, a second housing 230 and a keypad 250. The first housing 210 has a top surface 212. The second housing 230 has a cover 232. The fixing board 10 is fixed to the second housing 230. The keypad 250 is fixed on the second board 70 of the keypad lifting mechanism. The sliding board 30 is fixed to the first housing 210, so that the first housing 210 can move relative to the second housing 230.

Figure 7:
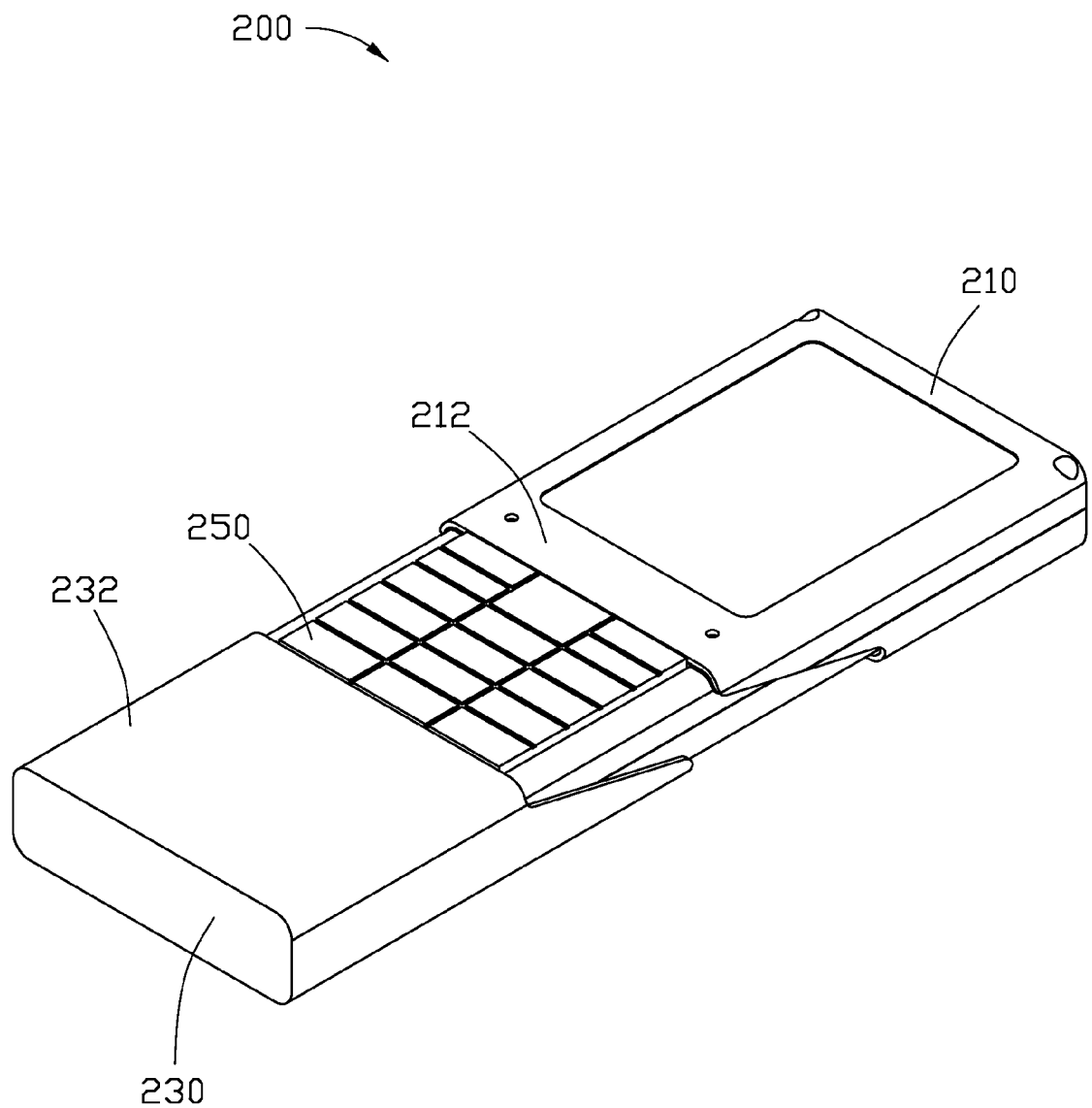
FIG. 7 is an assembled, schematic view of the portable terminal shown in FIG. 6, showing the keypad revealed.
Figure 8:
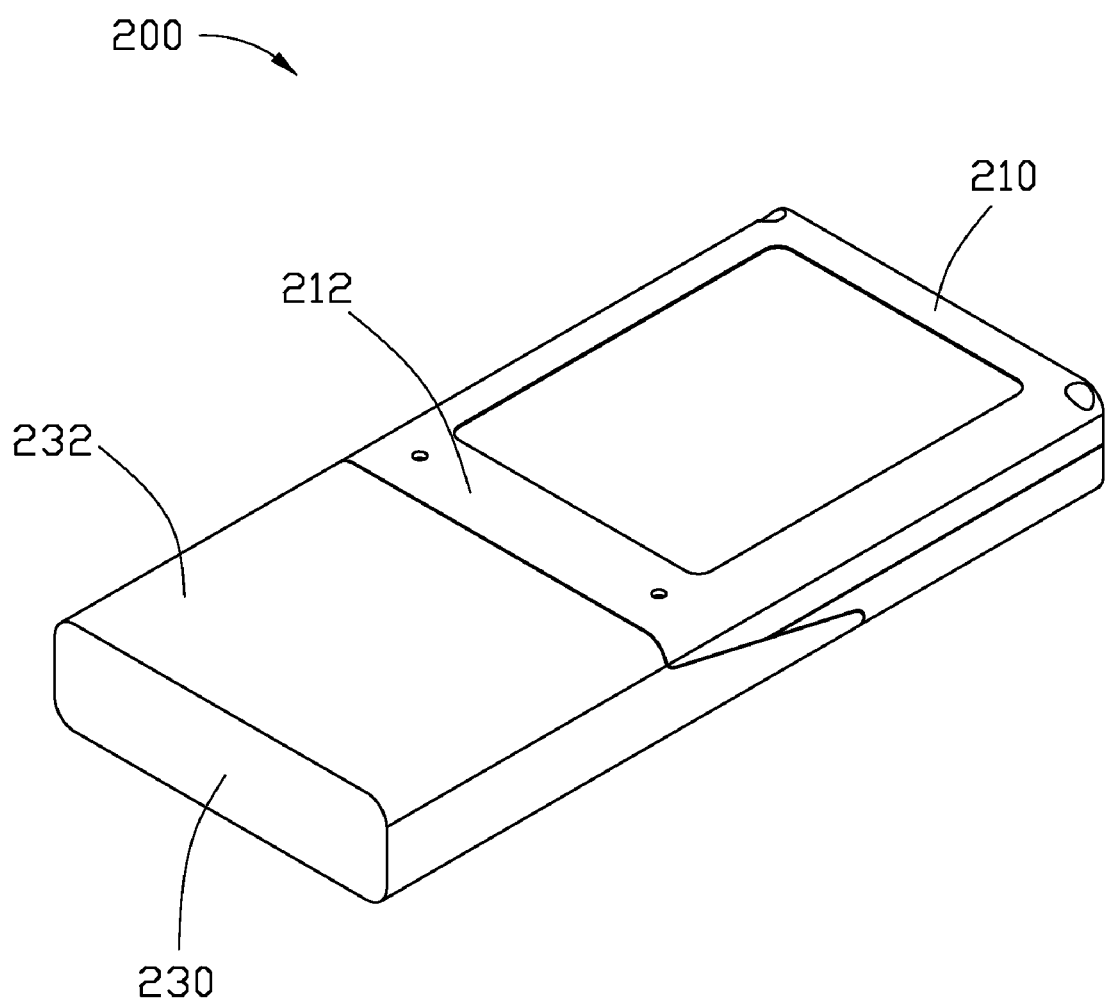
FIG. 8 is similar to FIG. 7, but showing the keypad hidden.

Referring to FIGS. 7-8, when the first housing 210 is pushed away from the second housing 230, the keypad 250 fixed on the second board 70 moves with the first housing 210 to be exposed. When the guiding frame 50 are stopped by the second protruding blocks 266 of the stopping members 20, the protrusions 76 of the second board 70 slide up along the slopes 592 of the guiding frame 50 and are then situated on the flat surfaces 594 of the wedges 59. Thus, the keypad 250 on the first board 40 is raised to be at a same level as the top surface 212 of the first housing 210. At the same time, the elastic elements 46 are deformed, and the second end 584 of each swing 58 is received between the first protruding block 264 and the second protruding block 266 of the stopping member 20.

When the first housing 210 is pushed toward the second housing 230, the first board 40 and the second board 70 are moved with the first housing 210. Since the second ends 584 of the swings 58 are stopped by the first protruding blocks 264, the second board 70 slides relative to the first board 40. The elastic elements 46 force the protrusions 76 of the second board 70 quickly to slide down along the wedges 59 of the guiding frame 50 until being situated on the first board 40. Thus, the keypad 250 on the second board 70 is moved down. At the same time, the swings 58 are rotated to be free from locking of the first protruding blocks 264, so that the guiding frame 50 moves with the second board 70 by friction. The keypad 250 on the keypad lifting mechanism is moved with the first housing 210, and is hidden by the cover 232 of the second housing 230 when the first housing 210 matches the second housing 230.

It is to be understood that the fixing board 10 may be one part of the second housing 230.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad lifting mechanism comprising:
   a fixing board, two stopping members being fixed on the fixing board;
   a first board slidable relative to the fixing board;
   a guiding frame, at least one wedge being formed on the guiding frame; and
   a second board including at least one protrusion, the second board sliding up or down relative to the first board by engagement of the at least one protrusion of the second board and the at least one wedge of the guiding frame, when the first board is moved relative to the fixing board, the guiding frame being stopped by the stopping members and the second board moving relative to the guiding frame to move up or down.

2. The keypad lifting mechanism as claimed in claim 1, wherein each stopping member comprises a first protruding block and a second protruding block, and the guiding frame is stopped by the first protruding block when the first board is pushed toward the fixing board, and is stopped by the second protruding block when the first board is pushed away from the fixing board.

3. The keypad lifting mechanism as claimed in claim 1, further comprising a sliding board, wherein the first board is fixed on the sliding board, and each of the stopping members defines a sliding groove allowing the sliding board to slide along.

4. The keypad lifting mechanism as claimed in claim 1, wherein a plurality of elastic elements are positioned between the first board and the second board, one end of each elastic element is fixed to the first board, and another end is fixed to the second board, and the elastic elements force the second board to move down relative to the guiding frame.

5. The keypad lifting mechanism as claimed in claim 1, wherein a plurality of positioning posts are formed on the first board, and the second board defines a plurality of positioning holes engaging with the positioning posts.

6. The keypad lifting mechanism as claimed in claim 1, wherein two guiding pieces are fixed on the first board, the guiding frame comprises two straight portions, and the straight portions respectively extend through and are slidable relative to the guiding pieces.

7. The keypad lifting mechanism as claimed in claim 2, wherein the guiding frame comprises a first bar and a second bar, two clips connecting the first bar and the second bar, the first bar includes two end portions extending through the clips, and the second protruding blocks of the stopping members resist the end portions so as to stop the guiding frame further moving.

8. The keypad lifting mechanism as claimed in claim 7, wherein two resisting columns are formed on the first board, a swing is rotatably attached to each clip at a middle area thereof, each swing comprises a first end and a second end, the first end of each swing resists one of the resisting columns, and the second end is rotated to positioned between the first protruding block and the second protruding block of the stopping member when the second board has been raised.

9. A portable terminal comprising:
   a first housing;
   a second housing;
   a keypad lifting mechanism including:
      a fixing board fixed to the second housing, two stopping members fixed on the fixing board;

a first board fixed to the first housing, the first board slidable relative to the fixing board so that the first housing is slidable relative to the second housing;

a guiding frame, at least one wedge being formed on the guiding frame; and a second board including at least one protrusion, the second board sliding up or down relative to the first board by engagement of the at least one protrusion of the second board and the at least one wedge of the guiding frame; and a keypad fixed on the second board of the keypad lifting mechanism, when the first housing being moved relative to the second housing, the guiding frame being stopped by the stopping members and the second board moving relative to the guiding frame so that the keypad is moved up or down.

10. The portable terminal as claimed in claim 9, wherein each stopping member comprises a first protruding block and a second protruding block, and the guiding frame is stopped by the first protruding when the first board is pushed toward the fixing board, and is stopped by the second protruding block when the first board is pushed away from the fixing board.

11. The portable terminal as claimed in claim 9, further comprising a sliding board, wherein the first board is fixed on the sliding board, and each stopping members defines a sliding groove allowing the sliding board to slide along.

12. The portable terminal as claimed in claim 9, wherein a plurality of elastic elements are positioned between the first board and the second board, one end of each elastic element is fixed to the first board, and another end is fixed to the second board, and the elastic elements forces the second board to move down relative to the guiding frame.

13. The portable terminal as claimed in claim 9, wherein a plurality of positioning posts are formed on the first board, and the second board defines a plurality of positioning holes engaging with the positioning posts.

14. The portable terminal as claimed in claim 9, wherein two guiding pieces are fixed on the first board, the guiding frame comprises two straight portions, and the straight portions respectively extend through and are slidable relative to the guiding pieces.

15. The portable terminal as claimed in claim 10, wherein the guiding frame comprises a first bar and a second board, two clips connecting the first bar and the second bar, the first bar includes two end portions extending through the clips, and the second protruding blocks of the stopping members resist the end portions so as to stop the guiding frame further moving.

16. The portable terminal as claimed in claim 15, wherein two resisting columns are formed on the first board, a swing is rotatably attached to each clip at a middle area thereof, each swing comprises a first end and a second end, the first end of each swing resists one of the resisting columns, and the second end is rotated to positioned between the first protruding block and the second protruding block of the stopping member when the second board has been raised.

17. A portable terminal comprising:
   a first housing;
   a second housing including a fixing board;
   a keypad lifting mechanism including:
      a sliding board fixed to the first housing;
      two stopping members, each stopping member includes a first protruding block and a second protruding block;
      a guiding frame being slidable relative to the sliding board, at least one wedge being formed on the guiding frame; and
      a second board including at least one protrusion, the second board sliding up or down relative to the first board by engagement of the at least one protrusion of the second board and the at least one wedge of the guiding frame; and
   a keypad fixed on the second board of the keypad lifting mechanism;
   wherein, the second protruding blocks of the stopping members stop the guiding frame from moving when the first housing is pushed away from the second housing, so that the second board moves relative to the guiding frame and the keypad is raised, and the first protruding blocks of the stopping members stop the guiding frame from moving with the second board so as to move down the keypad when the first housing is pushed toward the second housing.

18. The portable terminal as claimed in claim 17, wherein the stopping members are fixed on the fixing board, each stopping member defines a sliding groove allowing the sliding board to slide along.

19. The portable terminal as claimed in claim 17, wherein two guiding pieces are fixed on the sliding board, the guiding frame comprises two straight portions, and the straight portions respectively extend through and are slidable relative to the guiding pieces.

20. The portable terminal as claimed in claim 17, wherein the guiding frame comprises two end portions, and the second protruding blocks of the stopping members resist the end portions so as to stop the guiding frame further moving.

* * * * *